US012607224B2

(12) United States Patent
Yokoi et al.

(10) Patent No.: US 12,607,224 B2
(45) Date of Patent: Apr. 21, 2026

(54) FOIL BEARING AND FLUID MACHINERY

(71) Applicant: KABUSHIKI KAISHA TOYOTA JIDOSHOKKI, Kariya (JP)

(72) Inventors: Hironao Yokoi, Kariya (JP); Satoshi Koumura, Kariya (JP); Satoru Egawa, Kariya (JP); Masahiro Suzuki, Kariya (JP); Masafumi Tsuzuki, Kariya (JP); Kenta Owaki, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 18/850,889

(22) PCT Filed: Feb. 27, 2023

(86) PCT No.: PCT/JP2023/007034
§ 371 (c)(1),
(2) Date: Sep. 25, 2024

(87) PCT Pub. No.: WO2023/189092
PCT Pub. Date: Oct. 5, 2023

(65) Prior Publication Data
US 2025/0230839 A1      Jul. 17, 2025

(30) Foreign Application Priority Data

Mar. 31, 2022      (JP) ................................. 2022-060597

(51) Int. Cl.
*F16C 17/02* (2006.01)
*F04D 17/12* (2006.01)
(Continued)

(52) U.S. Cl.
CPC .......... *F16C 17/024* (2013.01); *F04D 17/122* (2013.01); *F04D 29/056* (2013.01);
(Continued)

(58) Field of Classification Search
None
See application file for complete search history.

(56) References Cited

U.S. PATENT DOCUMENTS

| | | | | |
|---|---|---|---|---|
| 8,353,631 | B2 * | 1/2013 | Kim | ...................... F16C 17/024 384/106 |
| 2011/0052110 | A1 * | 3/2011 | Kim | ...................... F16C 17/024 384/106 |
| 2021/0010531 | A1 | 1/2021 | Omori | |

FOREIGN PATENT DOCUMENTS

| | | |
|---|---|---|
| JP | 06-054915 U | 7/1994 |
| JP | 2009293733 A * | 12/2009 |

(Continued)

OTHER PUBLICATIONS

JP-2009293733-A Description Machine Translation (Year: 2009).*
International Search Report for PCT/JP2023/007034 dated May 16, 2023 (PCT/ISA/210).

*Primary Examiner* — Juan G Flores
(74) *Attorney, Agent, or Firm* — Sughrue Mion, PLLC

(57) ABSTRACT

A housing, a top foil including a bearing surface that faces the rotary member, and a bump foil placed between the top foil and the housing are provided. The bump foil is configured to elastically support the top foil by expanding in a rotation direction. When a load received by the bearing surface from the rotary member is less than or equal to a threshold value, the bump foil supports the top foil with a gap formed between the bump foil and the housing and with a gap formed between the bump foil and the top foil. When the load received by the bearing surface from the rotary member exceeds the threshold value, the top foil and the bump foil locally form a plain bearing to support the rotary member.

6 Claims, 9 Drawing Sheets

(51) Int. Cl.
    *F04D 29/056*     (2006.01)
    *F04D 29/28*     (2006.01)
    *F04D 29/42*     (2006.01)
    *F16C 27/02*     (2006.01)

(52) U.S. Cl.
    CPC ....... *F04D 29/284* (2013.01); *F04D 29/4206*
    (2013.01); *F16C 27/02* (2013.01); *F16C*
    *2360/00* (2013.01)

(56)             References Cited

FOREIGN PATENT DOCUMENTS

| | | | |
|---|---|---|---|
| JP | 2013-501902 | A | 1/2013 |
| JP | 2017-089384 | A | 5/2017 |
| JP | 2019-157889 | A | 9/2019 |

* cited by examiner

FOIL BEARING AND FLUID MACHINERY

CROSS REFERENCE TO RELATED APPLICATIONS

This application is a National Stage of International Application No. PCT/JP2023/007034, filed on Feb. 27, 2023, which claims the benefit of priority from Japanese Patent Application No. 2022-060597, filed Mar. 31, 2022.

TECHNICAL FIELD

The present disclosure relates to a foil bearing and fluid machinery.

BACKGROUND ART

A typical foil bearing rotationally supports a rotary member. The foil bearing includes a top foil, a bump foil, and a housing. The housing has an insertion hole through which the rotary member is inserted. The top foil includes a bearing surface facing the rotary member. The bump foil is placed between the top foil and the housing. The bump foil includes crest portions, which are in contact with the outer circumference surface of the top foil, and trough portions, which are in contact with the inner circumference surface of the housing. The crest portions and the trough portions are arranged alternately in the rotation direction of the rotary member.

When the rotational speed of the rotary member reaches a no-contact rotational speed, the dynamic pressure of an air film generated between the rotary member and the bearing surface separates the rotary member from the foil bearing. The foil bearing thus supports the rotary member without being in contact with the rotary member.

When the rotary member receives an excessive load, the rotary member may become excessively close to the bearing surface. This may apply an excessive load to the top foil. At this time, the section of the top foil receiving the excessive load is displaced toward the housing, so that the top foil presses some crest portions of the bump foil. This deforms the bump foil such that the crest portions become closer to the housing. This deformation may break the bump foil, causing a decrease in the bearing performance of the foil bearing. A decrease in the bearing performance of a foil bearing lowers the reliability of the fluid machinery that includes the foil bearing. As such, the possibility of the bump foil being damaged needs to be reduced.

Patent Literature 1 discloses a foil bearing that includes, in addition to a bump foil, protrusions that protrude from the inner surface of the housing toward the top foil. When an excessive load as described above acts on this foil bearing, the section of the top foil receiving the load comes into contact with the protrusions. The top foil is thus less likely to excessively press the bump foil, limiting damage to the bump foil.

CITATION LIST

Patent Literature

Patent Literature 1: U.S. Patent Application Publication No. 2021/0010531

SUMMARY OF INVENTION

Technical Problem

When the top foil of the foil bearing described in Patent Literature 1 is pressed against the protrusions, the sections of the top foil in contact with the protrusions may be deformed to conform to the shape of the protrusions. This deformation of the top foil may degrade the bearing performance of the foil bearing.

Solution to Problem

In accordance with one aspect of the present disclosure, a foil bearing includes a housing including an insertion hole through which a rotary member is to be inserted, a tubular top foil including a bearing surface that faces the rotary member, and a sheet-shaped bump foil located between the top foil and the housing. The bump foil includes multiple crest portions in contact with an outer circumference surface of the top foil and multiple trough portions in contact with an inner circumference surface of the housing. The crest portions and the trough portions are arranged alternately in a rotation direction of the rotary member. The crest portions and the trough portions are configured to expand in the rotation direction so as to elastically support the top foil. The bump foil is configured to, when a load received by the bearing surface from the rotary member is less than or equal to a threshold value, support the top foil with gaps formed between the crest portions and the housing and with gaps formed between the trough portions and the top foil. The bump foil is configured to, when the load received by the bearing surface from the rotary member exceeds the threshold value, support the top foil with the crest portions in contact also with the inner circumference surface of the housing and with the trough portions in contact also with the outer circumference surface of the top foil so that the top foil and the bump foil locally form a plain bearing and support the rotary member.

In the present disclosure, "contact" includes static contact as well as dynamic contact. For example, in a state before the rotary member rotates, the outer circumference surface of the top foil may be in contact with crest portions. Alternatively, the outer circumference surface of the top foil may be separated from the crest portions in a state before the rotary member rotates, and crest portions may become closer to and come in contact with the outer circumference surface of the top foil as the rotary member rotates. Likewise, in a state before the rotary member rotates, the inner circumference surface of the housing may be in contact with trough portions. Alternatively, the inner circumference surface of the housing may be separated from the trough portions in a state before the rotary member rotates, and trough portions may become closer to and come in contact with the inner circumference surface of the housing as the rotary member rotates.

In accordance with another aspect of the present disclosure, fluid machinery includes the rotary member, an impeller configured to compress a fluid by rotating integrally with the rotary member, an impeller housing accommodating the rotary member and the impeller, and the above-described foil bearing. The impeller housing includes a shroud surface that covers an outer circumference of the impeller. A tip clearance between the impeller and the shroud surface is greater than 0 even when the top foil and the bump foil locally form a plain bearing.

In accordance with a further aspect of the present disclosure, fluid machinery includes the rotary member, an impeller configured to compress a fluid by rotating integrally with the rotary member, an impeller housing accommodating the rotary member and the impeller, and the above-described foil bearing. The impeller housing includes a shroud surface that covers an outer circumference of the impeller. A distance between an outer circumference surface of the bump foil at the crest portion and the inner circumference surface of the housing in a radial direction of the rotary member is H1 in a state in which no load acts on the bearing surface from the rotary member, and a minimum value of a gap between the impeller and the shroud surface in the radial direction is greater than H1.

DESCRIPTION OF EMBODIMENTS

First Embodiment

Referring to FIGS. 1 to 9, a foil bearing and fluid machinery according to a first embodiment of are now described. For illustrative purposes, the fluid machinery is first described, followed by the foil bearing.
Basic Configuration of Fluid Machinery 10

Figure 1:
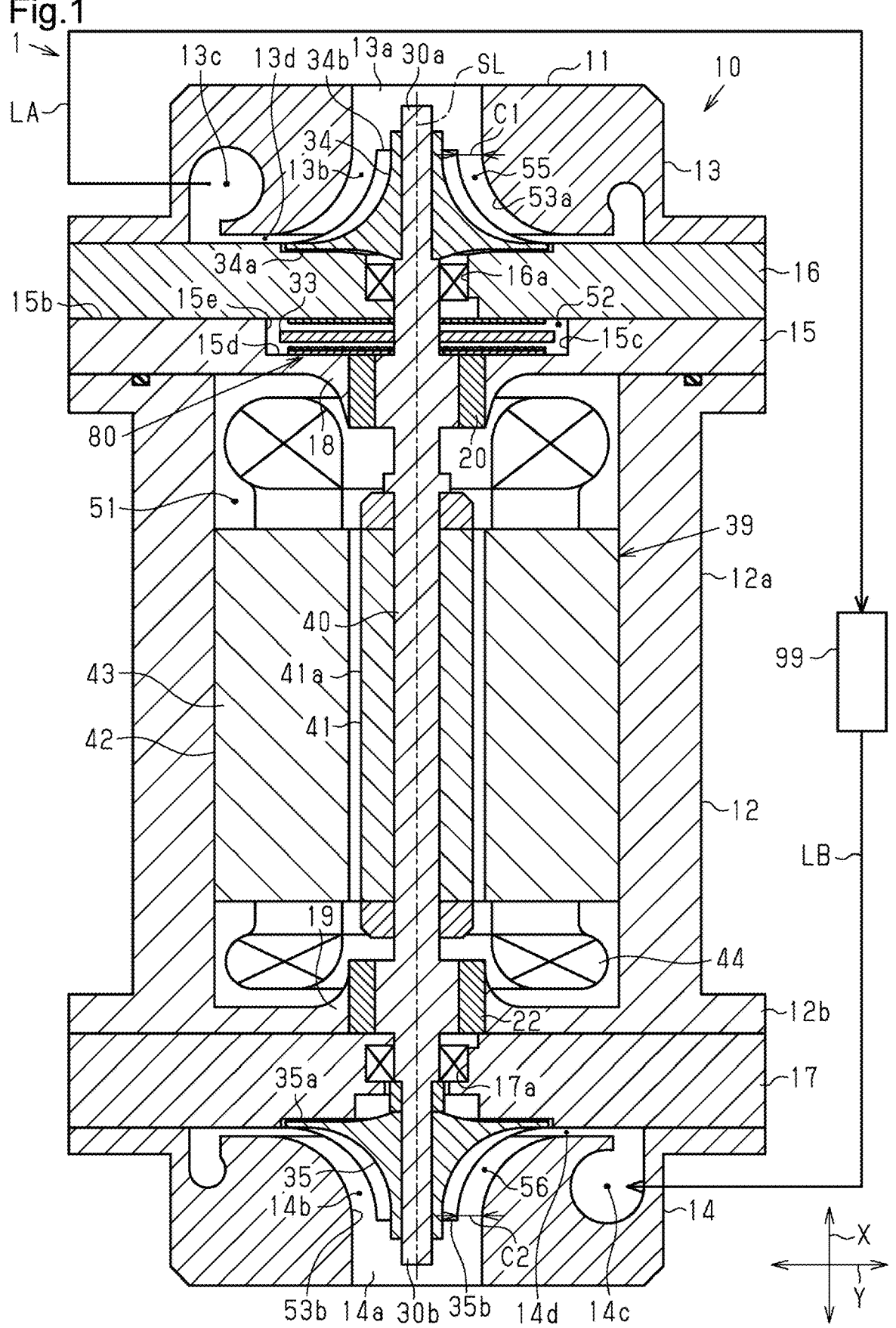
FIG. 1 is a cross-sectional view showing fluid machinery.

As shown in FIG. 1, a fluid machinery 10 includes a rotation shaft 40, which is a rotary member, a first impeller 34, and a second impeller 35. The fluid machinery 10 includes a housing 11. The fluid machinery 10 includes a first foil bearing 20 and a second foil bearing 22. The fluid machinery 10 includes an electric motor 39. The fluid machinery 10 of the first embodiment is installed in a vehicle. For example, the fluid machinery 10 may be used as a centrifugal compressor for compressing air that is an oxygen-containing fluid supplied to the fuel cell in a fuel cell vehicle, or as a centrifugal compressor for compressing a refrigerant in an on-board refrigeration circuit.

The housing 11 is made of metal. An example of the material of the housing 11 is aluminum. The housing 11 includes a motor housing member 12, a first impeller housing member 13, a second impeller housing member 14, a first plate 15, a second plate 16, and a third plate 17. In other words, the fluid machinery 10 includes the first impeller housing member 13 and the second impeller housing member 14. The housing 11 includes a bearing housing member 71 (FIG. 2), which will be described below.

The motor housing member 12 has a tubular circumferential wall 12a and a flat end wall 12b located at the first end portion of the circumferential wall 12a. The second end portion of the circumferential wall 12a is an open end. The first plate 15 closes the second end portion of the motor housing member 12. The inner surface of the motor housing member 12 and the first plate 15 define a motor chamber 51. The motor chamber 51 accommodates an electric motor 39.

The first plate 15 includes a first bearing holding portion 18. The first bearing holding portion 18 is cylindrical. A recess 15c opens at the end surface 15b of the first plate 15 on the side opposite to the motor housing member 12. The bottom surface 15d of the recess 15c has an opening connecting the inside of the first bearing holding portion 18 and the inside of the recess 15c. The axis of the recess 15c agrees with the axis of the first bearing holding portion 18. The recess 15c has a side surface 15e connecting the end surface 15b and the bottom surface 15d.

The end wall 12b of the motor housing member 12 includes a second bearing holding portion 19. The second bearing holding portion 19 is cylindrical. The second bearing holding portion 19 opens at opposite end surfaces of the end wall 12b. The axis of the second bearing holding portion 19 agrees with the axis of the first bearing holding portion 18.

The second plate 16 is connected to the first plate 15. The second plate 16 extends along the first plate 15. The second plate 16 includes a first shaft insertion hole 16a in the center. The first shaft insertion hole 16a extends through the second plate 16. The first shaft insertion hole 16a is connected to the recess 15c. The axis of the first shaft insertion hole 16a agrees with the axis of the recess 15c. The inner surface of the first plate 15 defining the recess 15c and the second plate 16 define a thrust bearing accommodation chamber 52.

The first impeller housing member 13 is tubular and includes a suction port 13a. The suction port 13a is a circular hole through which air, which is an example of a working fluid, is drawn. The first impeller housing member 13 is connected to the second plate 16. The axis of the suction port 13a agrees with the axis of the first shaft insertion hole 16a of the second plate 16. The suction port 13a opens at the end surface of the first impeller housing member 13 opposite to the second plate 16. A first impeller chamber 13b, a discharge chamber 13c, and a first diffuser passage 13d are defined between the first impeller housing member 13 and the second plate 16.

The first impeller chamber 13b is connected to the suction port 13a. The discharge chamber 13c extends about the axis of the suction port 13a around the first impeller chamber 13b. The first diffuser passage 13d provides connection between the first impeller chamber 13b and the discharge chamber 13c. The first impeller chamber 13b is connected to the first shaft insertion hole 16a of the second plate 16.

The first impeller housing member 13 includes a first shroud surface 53a. The first shroud surface 53a defines the first impeller chamber 13b together with the second plate 16. The first shroud surface 53a has a truncated cone shape.

The third plate 17 is connected to the end wall 12b of the motor housing member 12. The third plate 17 includes a second shaft insertion hole 17a in the center. The second shaft insertion hole 17a is connected to the inside of the second bearing holding portion 19. The axis of the second shaft insertion hole 17a agrees with the axis of the second bearing holding portion 19.

The second impeller housing member 14 is tubular and includes a discharge port 14a, which is a circular hole through which air is drawn. The second impeller housing member 14 is connected to the end surface of the third plate 17 opposite to the motor housing member 12. The axis of the discharge port 14a agrees with the axis of the second shaft insertion hole 17a of the third plate 17. The discharge port 14a opens at the end surface of the second impeller housing member 14 opposite to the third plate 17. A second impeller chamber 14b, a suction chamber 14c, and a second diffuser passage 14d are defined between the second impeller housing member 14 and the third plate 17.

The second impeller chamber 14b is connected to the discharge port 14a. The suction chamber 14c extends about the axis of the discharge port 14a around the second impeller chamber 14b. The second diffuser passage 14d provides connection between the second impeller chamber 14b and the suction chamber 14c. The second impeller chamber 14b is connected to the second shaft insertion hole 17a.

The second impeller housing member 14 includes a second shroud surface 53b. The second shroud surface 53b defines the second impeller chamber 14b together with the third plate 17. The second shroud surface 53b has a truncated cone shape.

Rotation Shaft 40

The housing 11 accommodates a rotation shaft 40, which is a rotary member. The rotation shaft 40 is rotated by the electric motor 39. Sections of the rotation shaft 40 are located in the first impeller chamber 13b and the second impeller chamber 14b. Thus, the rotation shaft 40 is accommodated in the first impeller housing member 13 and the second impeller housing member 14.

The first impeller chamber 13b, the first shaft insertion hole 16a, the recess 15c of the first plate 15, the inside of the first bearing holding portion 18, the motor chamber 51, the inside of the second bearing holding portion 19, the second shaft insertion hole 17a, and the second impeller chamber 14b are arranged in that order along the rotation shaft 40. The axis SL of the rotation shaft 40 agrees with the central axes of the first bearing holding portion 18, the second bearing holding portion 19, the first shaft insertion hole 16a, the second shaft insertion hole 17a, the suction port 13a, and the discharge port 14a.

In the following description, the "axial direction of the rotation shaft 40", which is the direction along the axis SL of the rotation shaft 40, may also be referred to as a "thrust direction". The "radial direction of the rotation shaft 40" may also be referred to as a "radial direction". The axial direction of the rotation shaft 40 may be indicated by the symbol X. The radial direction of the rotation shaft 40 may be indicated by the symbol Y. The radial direction Y corresponds to the radial direction of the rotary member.

The rotation shaft 40 includes a disk-shaped support plate 33. The support plate 33 projects from the outer circumference surface of the rotation shaft 40. The support plate 33 is press-fitted onto the outer circumference surface of the rotation shaft 40. The support plate 33 rotates integrally with the rotation shaft 40. The support plate 33 is placed in the thrust bearing accommodation chamber 52.

The support plate 33 is supported by a thrust bearing 80. The thrust bearing 80 includes bearing portions placed between the first plate 15 and the support plate 33 and between the second plate 16 and the support plate 33. When the support plate 33 rotates along with the rotation of the rotation shaft 40, dynamic pressure is generated between the support plate 33 and the thrust bearing 80. As a result, the support plate 33 is spaced apart from the thrust bearing 80.

The thrust bearing 80 rotationally supports the support plate 33 without being in contact with the support plate 33. As such, the thrust bearing 80 is an air dynamic pressure bearing that rotationally supports the rotation shaft 40 in the thrust direction.

First Impeller 34

The first impeller 34 is made of metal. An example of the material of the first impeller 34 is aluminum. The first impeller 34 is connected to a first end portion 30a of the rotation shaft 40. The first impeller 34 is an impeller that rotates integrally with the rotation shaft 40. The first impeller 34 is accommodated in the first impeller chamber 13b. That is, the first impeller housing member 13 accommodates the first impeller 34.

The first impeller 34 has a truncated cone shape. The diameter of the first impeller 34 gradually decreases from a first back surface 34a of the first impeller 34 toward a first distal end surface 34b of the first impeller 34. The first back surface 34a faces the second plate 16 in the axial direction X. The first shroud surface 53a extends along the outer circumference of the first impeller 34 from the first back surface 34a toward the first distal end surface 34b. As a result, the first shroud surface 53a covers the outer circumference of the first impeller 34. The first impeller 34 rotates integrally with the rotation shaft 40 to compress air, which is a fluid.

Second Impeller 35

The second impeller 35 is made of metal. An example of the material of the second impeller 35 is aluminum. The second impeller 35 is connected to a second end portion 30b of the rotation shaft 40. The second impeller 35 is an impeller that rotates integrally with the rotation shaft 40. The second impeller 35 is accommodated in the second impeller chamber 14b. That is, the second impeller 35 is accommodated in the second impeller housing member 14.

The second impeller 35 has a truncated cone shape. The diameter of the second impeller 35 gradually decreases from a second back surface 35a of the second impeller 35 toward a second distal end surface 35b of the second impeller 35. The second back surface 35a faces the third plate 17 in the axial direction X. The second shroud surface 53b extends along the outer circumference of the second impeller 35 from the second back surface 35a toward the second distal end surface 35b. As a result, the second shroud surface 53b covers the outer circumference of the second impeller 35. The second impeller 35 rotates integrally with the rotation shaft 40 to compress air, which is a fluid.

First Tip Clearance 55

A first tip clearance 55 separates the first impeller 34 from the first shroud surface 53a. The first tip clearance 55 is a gap between the outer circumference of the first impeller 34 and the first shroud surface 53a, and extends from the first distal end surface 34b to the first back surface 34a of the first impeller 34.

The dimension of the first tip clearance 55 in the radial direction Y is referred to as a first clearance dimension C1. The first clearance dimension C1 is the dimension of the gap in the radial direction Y between the first impeller 34 and the first shroud surface 53a. The first clearance dimension C1 may be uniform or vary from the first distal end surface 34b to the first back surface 34a of the first impeller 34. For example, the first clearance dimension C1 may decrease from the first distal end surface 34b toward the first back surface 34a. In FIG. 1, the size of the first clearance dimension C1 is shown larger than the actual size.

Second Tip Clearance 56

A second tip clearance 56 separates the second impeller 35 from the second shroud surface 53*b*. The second tip clearance 56 is a gap between the outer circumference of the second impeller 35 and the second shroud surface 53*b*, and extends from the second distal end surface 35*b* to the second back surface 35*a* of the second impeller 35.

The dimension of the second tip clearance 56 in the radial direction Y is referred to as a second clearance dimension C2. The second clearance dimension C2 is the dimension of the gap in the radial direction Y between the second impeller 35 and the second shroud surface 53*b*. The second clearance dimension C2 may be uniform or vary from the second distal end surface 35*b* to the second back surface 35*a* of the second impeller 35. For example, the second clearance dimension C2 may decrease from the second distal end surface 35*b* toward the second back surface 35*a*. In FIG. 1, the size of the second clearance dimension C2 is shown larger than the actual size. In the first embodiment, the second clearance dimension C2 is the same as the first clearance dimension C1.

Electric Motor 39

The electric motor 39 is placed between the first impeller 34 and the second impeller 35 in the axial direction X. The electric motor 39 is accommodated in the motor chamber 51. The electric motor 39 includes a stator 42 and a rotor 41. The stator 42 includes a cylindrical stator core 43 and a coil 44 wound around the stator core 43. The stator core 43 is fixed to the inner surface of the circumferential wall 12*a* of the motor housing member 12.

The rotor 41 is placed inside the stator core 43 in the motor chamber 51. The rotor 41 rotates integrally with the rotation shaft 40. The rotor 41 includes a rotor core 41*a* fixed to the rotation shaft 40 and multiple permanent magnets (not shown) provided on the rotor core 41*a*. When power controlled by an inverter device (not shown) is supplied to the coil 44, the rotor 41 rotates. The rotation shaft 40 rotates integrally with the rotor 41.

Fuel Cell System 1

The vehicle in which the fluid machinery 10 is installed includes a fuel cell system 1. The fuel cell system 1 includes a fuel cell stack 99, which is an on-board fuel cell, fluid machinery 10, a supply flow passage LA, and a discharge flow passage LB. The fuel cell stack 99 includes multiple battery cells. The supply flow passage LA connects the discharge chamber 13*c* and the fuel cell stack 99. The discharge flow passage LB connects the fuel cell stack 99 and the suction chamber 14*c*.

When the rotation shaft 40 rotates integrally with the rotor 41, the first impeller 34 and the second impeller 35 rotate integrally with the rotation shaft 40. Then, the air drawn in through the suction port 13*a* is compressed by the first impeller 34 in the first impeller chamber 13*b*, passes through the first diffuser passage 13*d*, and is discharged from the discharge chamber 13*c*. The air discharged from the discharge chamber 13*c* is supplied to the fuel cell stack 99 via the supply flow passage LA. The air supplied to the fuel cell stack 99 is used by the fuel cell stack 99 to generate electricity. The air passes through the fuel cell stack 99.

The air passing through the fuel cell stack 99 is discharged as exhaust air from the fuel cell stack 99 to the discharge flow passage LB. The exhaust air from the fuel cell stack 99 is drawn into the suction chamber 14*c* via the discharge flow passage LB. The exhaust air from the fuel cell stack 99 that is drawn into the suction chamber 14*c* is discharged to the second impeller chamber 14*b* through the second diffuser passage 14*d*. The second impeller 35 is rotated by the exhaust air from the fuel cell stack 99 discharged into the second impeller chamber 14*b*.

The rotation shaft 40 is rotated not only by the electric motor 39 but also by the rotation of the second impeller 35, which is rotated by the exhaust air from the fuel cell stack 99. The rotation of the second impeller 35 caused by the exhaust air from the fuel cell stack 99 assists the rotation of the rotation shaft 40. The exhaust air from the fuel cell stack 99 discharged into the suction chamber 14*c* is then discharged to the outside through the discharge port 14*a*.

Configuration of First Foil Bearing 20 and Second Foil Bearing 22

The first bearing holding portion 18 holds the first foil bearing 20. The second bearing holding portion 19 holds the second foil bearing 22. Thus, the first and second foil bearings 20 and 22 are placed within the housing 11. The first and second foil bearings 20 and 22 are both examples of foil bearings according to the present disclosure. The first and second foil bearings 20 and 22 rotationally support the rotation shaft 40.

The first and second foil bearings 20 and 22 support the rotation shaft 40 in contact with the rotation shaft 40 until the rotational speed of the rotation shaft 40 reaches a no-contact rotational speed. The no-contact rotational speed is the rotational speed of the rotation shaft 40 at which the rotation shaft 40 becomes spaced apart from the first and second foil bearings 20 and 22. Rotation of the rotation shaft 40 generates dynamic pressure between the rotation shaft 40 and the first foil bearing 20 and between the rotation shaft 40 and the second foil bearing 22. When the rotational speed of the rotation shaft 40 reaches the no-contact rotational speed, the resulting dynamic pressure separates the rotation shaft 40 from the first and second foil bearings 20 and 22. As a result, the first and second foil bearings 20 and 22 rotationally support the rotation shaft 40 in a non-contact manner. Thus, the first and second foil bearings 20 and 22 rotationally support the rotation shaft 40 in the radial direction.

The specific configuration of the first foil bearing 20 is now described. The shape of the second foil bearing 22 is the same as the shape of the first foil bearing 20. As such, the configuration of the second foil bearing 22 that is the same as the configuration of the first foil bearing 20 is not described in detail below.

Figure 2:
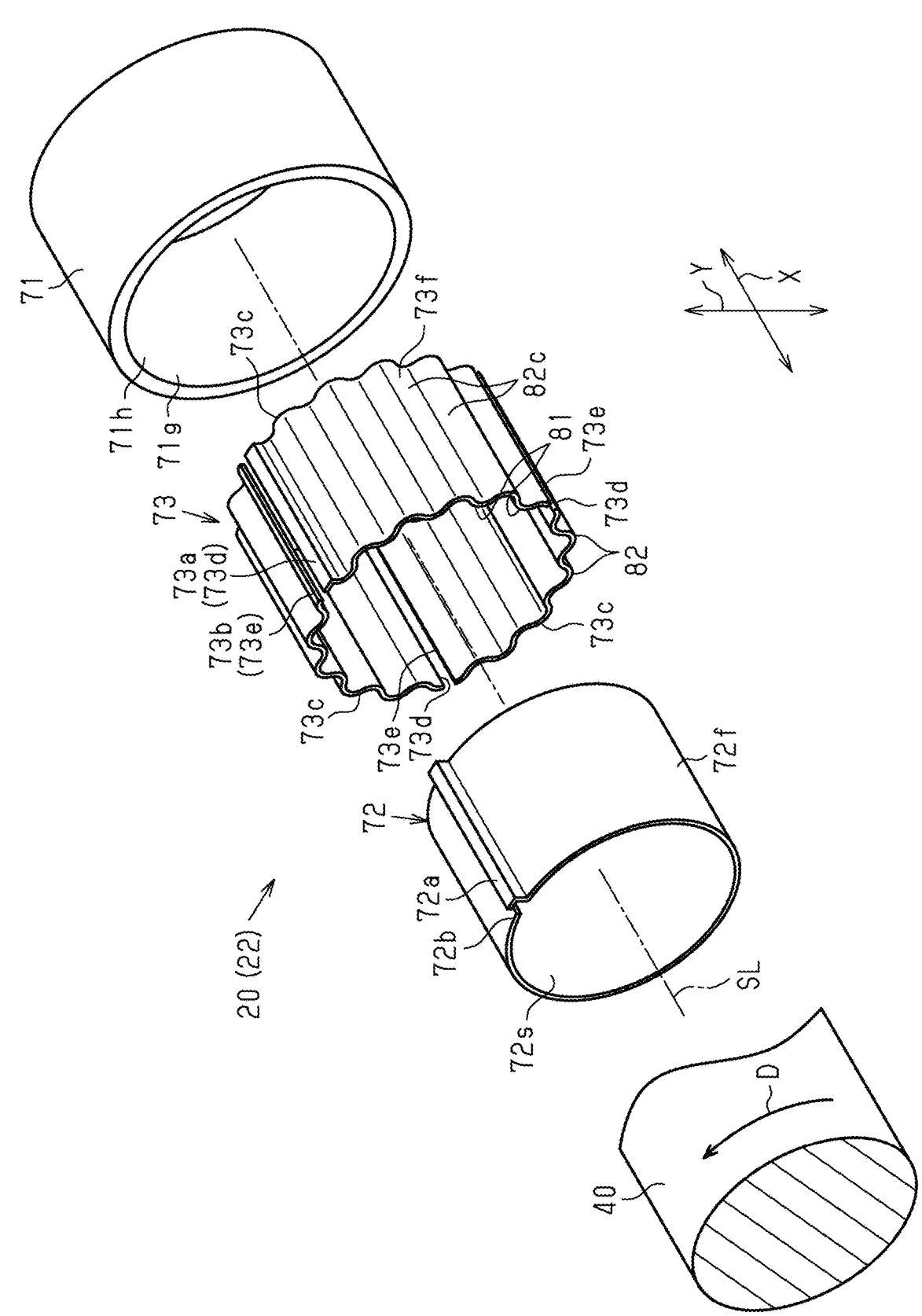
FIG. 2 is an exploded perspective view showing a first foil bearing of a first embodiment.
Figure 3:
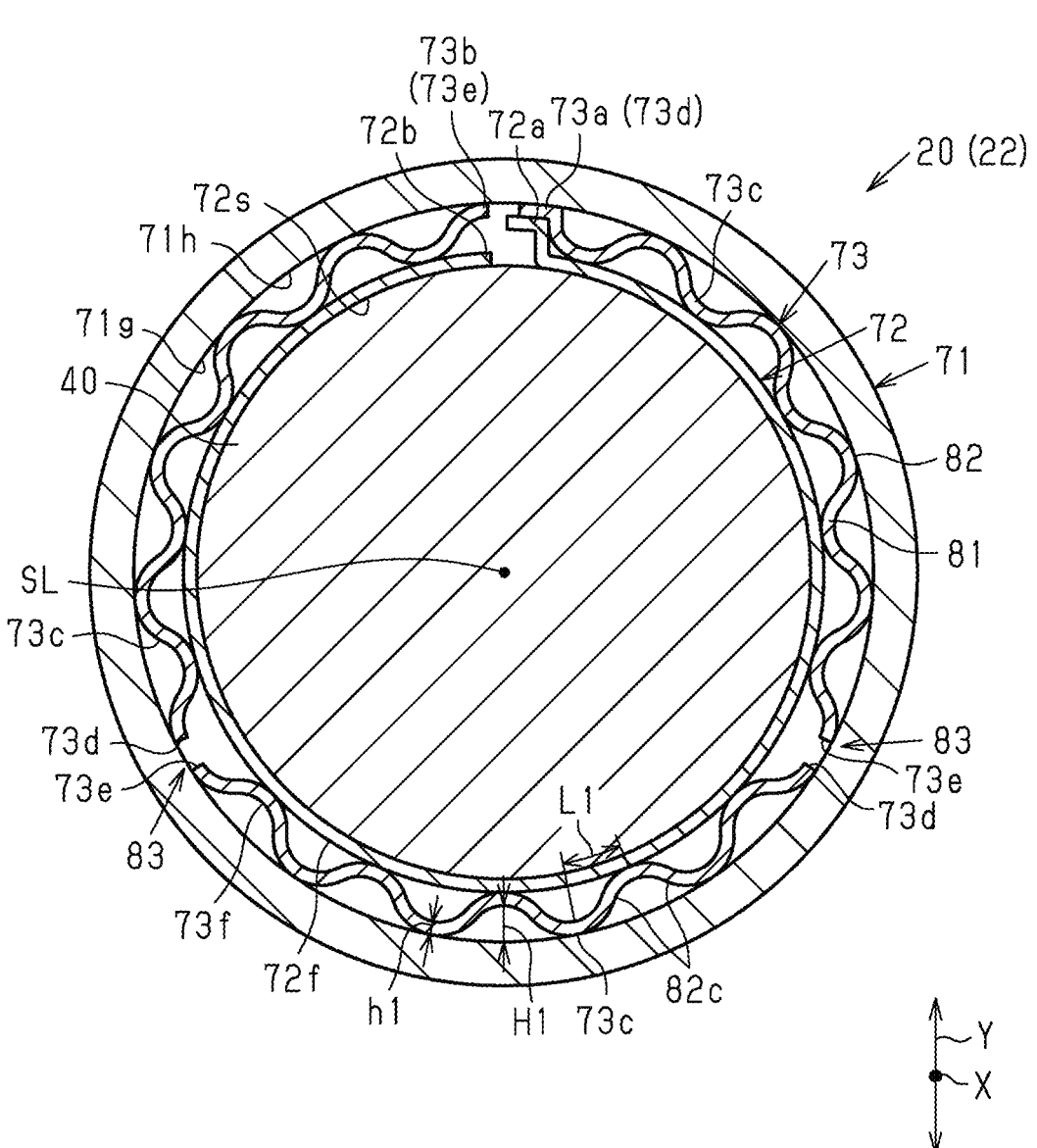
FIG. 3 is a cross-sectional view showing the first foil bearing and a rotation shaft of the first embodiment.

As shown in FIGS. 2 and 3, the first foil bearing 20 includes a bearing housing member 71, a top foil 72, and a bump foil 73. Since the housing 11 includes the bearing housing member 71, it may be considered that the first foil bearing 20 includes the housing 11.

Bearing Housing Member 71

The bearing housing member 71 is cylindrical. The axis of the bearing housing member 71 agrees with the axis SL of the rotation shaft 40. Thus, the axial direction X is also the axial direction of the bearing housing member 71. The radial direction Y is also the radial direction of the bearing housing member 71. The bearing housing member 71 has an insertion hole 71*h* through which the rotation shaft 40 is inserted. The insertion hole 71*h* is a through-hole extending through the bearing housing member 71 in the axial direction X.

As shown in FIGS. 1 and 2, the first bearing holding portion 18 holds the bearing housing member 71 of the first foil bearing 20. The bearing housing member 71 of the first foil bearing 20 is separate from the first bearing holding portion 18. The second bearing holding portion 19 holds the bearing housing member 71 of the second foil bearing 22. The bearing housing member 71 of the second foil bearing 22 is separate from the second bearing holding portion 19.

Top Foil 72

As shown in FIGS. 2 and 3, the top foil 72 is tubular. The top foil 72 is substantially cylindrical. The top foil 72 is located inside the bearing housing member 71. The top foil 72 extends inside the bearing housing member 71 in the circumferential direction of the bearing housing member 71. Hereinafter, the circumferential direction of the bearing housing member 71 may be simply referred to as the "circumferential direction". The top foil 72 has the shape of a sheet. In particular, the top foil 72 is formed from a flexible sheet of metal such as stainless steel. More specifically, the top foil 72 is obtained by curving the metal sheet into a tubular shape so that its longitudinal direction extends in the circumferential direction and its transverse direction extends in the axial direction X.

One edge in the circumferential direction of the top foil 72 is fixed to the bearing housing member 71 by welding or interference fit, and the other edge is not fixed to the bearing housing member 71. The edge of the top foil 72 fixed to the bearing housing member 71 in this manner is referred to as a first fixed edge portion 72a, and the edge of the top foil 72 not fixed to the bearing housing member 71 is referred to as a first free edge portion 72b. The first fixed edge portion 72a is bent outward of the top foil 72 in the radial direction Y. The first free edge portion 72b is spaced apart from the proximal end of the first fixed edge portion 72a in the circumferential direction. Thus, the top foil 72 is an open loop (non-annular), in which a part of a closed loop is cut out. "Open loop" refers to a generally looped shape including a gap, such as a C-shape.

The top foil 72 is placed outward of the rotation shaft 40 in the radial direction Y. The top foil 72 faces the rotation shaft 40. The top foil 72 has a bearing surface 72s. The inner surface of the top foil 72 forms the bearing surface 72s facing the rotation shaft 40. The top foil 72 rotationally supports the rotation shaft 40 in a non-contact state when the rotation shaft 40 rotates.

Bump Foil 73

The bump foil 73 is generally cylindrical. The bump foil 73 is placed between the top foil 72 and the bearing housing member 71 in the radial direction Y. The bump foil 73 has the shape of a sheet. In particular, the bump foil 73 is formed from a flexible sheet of metal such as stainless steel. More specifically, the bump foil 73 is obtained by curving the metal sheet into a tubular shape so that its longitudinal direction extends in the circumferential direction and its transverse direction extends in the axial direction X. The thickness of the bump foil 73 is indicated as h1. The thickness h1 may be substantially the same as the thickness of the top foil 72.

One edge in the circumferential direction of the bump foil 73 is fixed to the bearing housing member 71 by welding or interference fit, and the other edge is not fixed to the bearing housing member 71. The edge of the bump foil 73 fixed to the bearing housing member 71 in this manner is referred to as a second fixed edge portion 73a, and the edge of the bump foil 73 not fixed to the bearing housing member 71 is referred to as a second free edge portion 73b. The second fixed edge portion 73a is bent outward of the bump foil 73 in the radial direction Y. The second free edge portion 73b is spaced apart from the proximal end of the second fixed edge portion 73a in the circumferential direction. Thus, the bump foil 73 is an open loop (non-annular), in which a part of a closed loop is cut out. The bump foil 73 elastically supports the top foil 72.

The bump foil 73 includes crest portions 81 and trough portions 82. The crest portions 81 are in contact with the outer circumference surface 72f of the top foil 72. The trough portions 82 are in contact with the inner circumference surface 71g of the bearing housing member 71. The crest portions 81 and the trough portions 82 are arranged alternately in the rotation direction D of the rotation shaft 40.

Each trough portion 82 extends in a direction away from the outer circumference surface 72f of the top foil 72 and is curved in an arc shape so as to bulge toward the inner circumference surface 71g of the bearing housing member 71. Each crest portion 81 extends from end portions 82c of the trough portions 82 adjacent in the rotation direction D of the rotation shaft 40 toward the outer circumference surface 72f of the top foil 72, and is curved in an arc shape so as to bulge toward the top foil 72. The end portions 82c of the trough portions 82 are boundary sections between the crest portions 81 and the trough portions 82 of the bump foil 73. The crest portions 81 and the trough portions 82 expand in the rotation direction D of the rotation shaft 40, allowing the bump foil 73 to elastically support the top foil 72.

The bump foil 73 is divided in the rotation direction D of the rotation shaft 40 into multiple segments 73c. For example, the bump foil 73 includes three segments 73c. All the segments 73c of the bump foil 73 are hereinafter also referred to as the segments 73c. The segments 73c may have substantially the same dimensions in the rotation direction D of the rotation shaft 40, or each or some of the segments 73c may have different dimensions. The segments 73c may have the same number of crest portions 81, or each or some of the segments 73c may have different numbers of crest portions 81. The segments 73c may have the same number of trough portions 82, or each or some of the segments 73c may have different numbers of trough portions 82.

Each segment 73c includes, in the rotation direction D of the rotation shaft 40, a fixed edge 73d, which is fixed to the bearing housing member 71, and a free edge 73e, which is not fixed to the bearing housing member 71. Of the multiple segments 73c, one segment 73c has a fixed edge 73d that is a second fixed edge portion 73a, and another segment 73c has a free edge 73e that is a second free edge portion 73b. In each segment 73c, one edge in the rotation direction D of the rotation shaft 40 is a fixed edge 73d. In each segment 73c, the edge opposite to the fixed edge 73d is a free edge 73e.

Of two segments 73c adjacent to each other in the rotation direction D of the rotation shaft 40, the fixed edge 73d of one segment 73c is adjacent to the free edge 73e of the other. In each segment 73c, the fixed edge 73d and the free edge 73e extend in the axial direction X between one end and the other end of the segment 73c in the axial direction X.

Of two adjacent segments 73c, the fixed edge 73d of one segment 73c is spaced apart from the free edge 73e of the other in the rotation direction D of the rotation shaft 40. The segments 73c are arranged such that clearances 83 are formed between adjacent fixed edges 73d and free edges 73e regardless of expansion.

No-Load State SN

Referring to FIG. 3, the first foil bearing 20 in a state in which no load acts on the bearing surface 72s from the rotation shaft 40 is now described. The state in which no load acts on the bearing surface 72s from the rotation shaft 40 refers to a state in which the rotation shaft 40 is not rotating and the bearing surface 72s is in contact with the rotation shaft 40 over the entire circumference. This state, in which no load acts on the bearing surface 72s from the rotation shaft 40, is hereinafter referred to as a no-load state SN.

As shown in FIG. 3, in the no-load state SN, each crest portion 81 of the bump foil 73 is locally in contact with the outer circumference surface 72*f* of the top foil 72. In the no-load state SN, the distal end sections of the crest portions 81 in the direction of protrusion toward the top foil 72 are in contact with the outer circumference surface 72*f* of the top foil 72. In the no-load state SN, each trough portion 82 of the bump foil 73 is locally in contact with the inner circumference surface 71*g* of the bearing housing 71. In the no-load state SN, the distal end sections of the trough portions 82 in the direction of protrusion toward the bearing housing member 71 are in contact with the inner circumference surface 71*g* of the bearing housing member 71.

In the no-load state SN, the distance in the radial direction Y between the outer circumference surface 73*f* of the bump foil 73 at the crest portion 81 and the inner circumference surface 71*g* of the bearing housing member 71 is defined as a first distance H1. The first distance H1 is less than a first clearance dimension C1, which is the dimension of the first tip clearance 55 in the radial direction Y, and a second clearance dimension C2, which is the dimension of the second tip clearance 56 in the radial direction Y. That is, the minimum value of the first clearance dimension C1, which is the dimension of the gap between the first impeller 34 and the first shroud surface 53*a* in the radial direction Y, is greater than the first distance H1. The minimum value of a second clearance dimension C2, which is the dimension of the gap between the second impeller 35 and the second shroud surface 53*b* in the radial direction Y, is greater than the first distance H1.

In the no-load state SN, the distance between the adjacent crest portions 81 and the trough portions 82 in the rotation direction D of the rotation shaft 40 is a second distance L1. The second distance L1 is the distance in the rotation direction D between the distal end in the protruding direction of a crest portion 81 and the distal end in the protruding direction of a trough portion 82 adjacent to the crest portion 81 in the rotation direction D. The thickness h1 of the bump foil 73, the first distance H1, and the second distance L1 have a relationship of $L1^2/600h1 > H1$.

In the no-load state SN, a clearance 83 is formed between adjacent ones of the fixed edges 73*d* and the free edges 73*e*. In other words, in the no-load state SN, between two segments 73*c* adjacent in the rotation direction D of the rotation shaft 40, there is a clearance 83 in which the bump foil 73 is not located.

The no-load state SN is different from a state in which the rotation shaft 40 is simply not rotating. When the rotation shaft 40 is not rotating and not in the no-load state SN, the rotation shaft 40 is in contact with the entire or a part in the rotation direction D of the rotation shaft 40 of the bearing surface 72*s* of the top foil 72. When the rotation shaft 40 is not rotating and not in the no-load state SN, a load acts on the bearing surface 72*s* from the rotation shaft 40 at the section of the top foil 72 that is in contact with the rotation shaft 40.

First State S1

Figure 4:
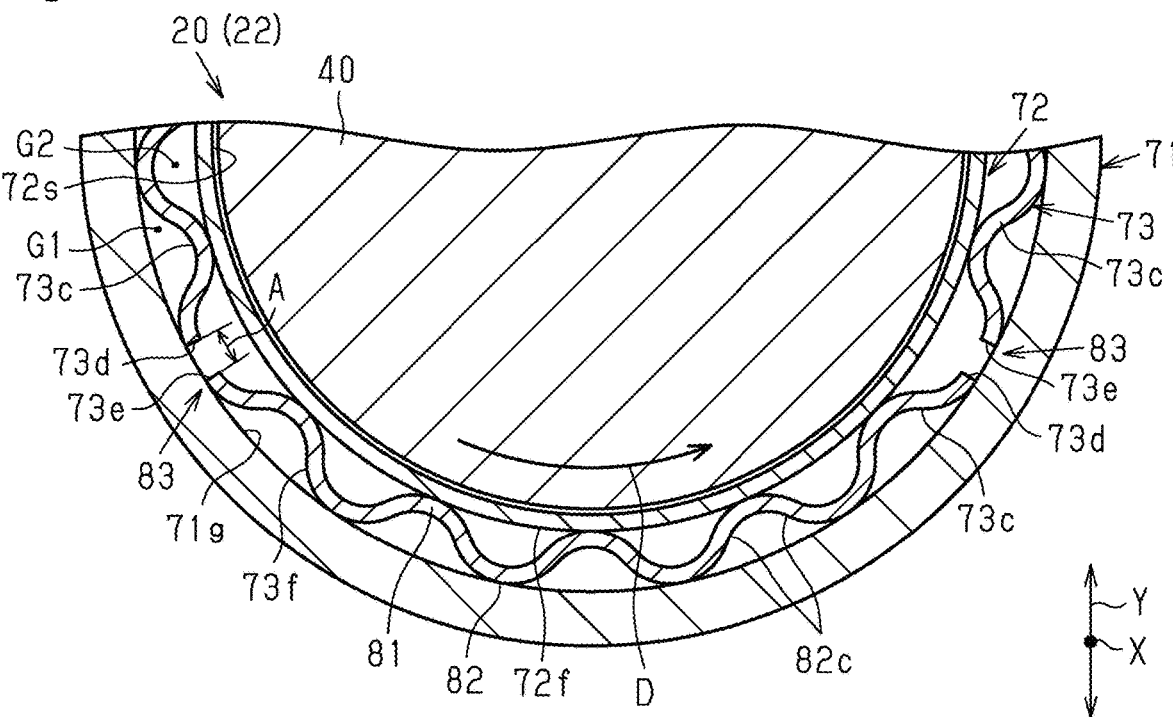
FIG. 4 is a cross-sectional view showing the first foil bearing of the first embodiment in a first state.
Figure 5:
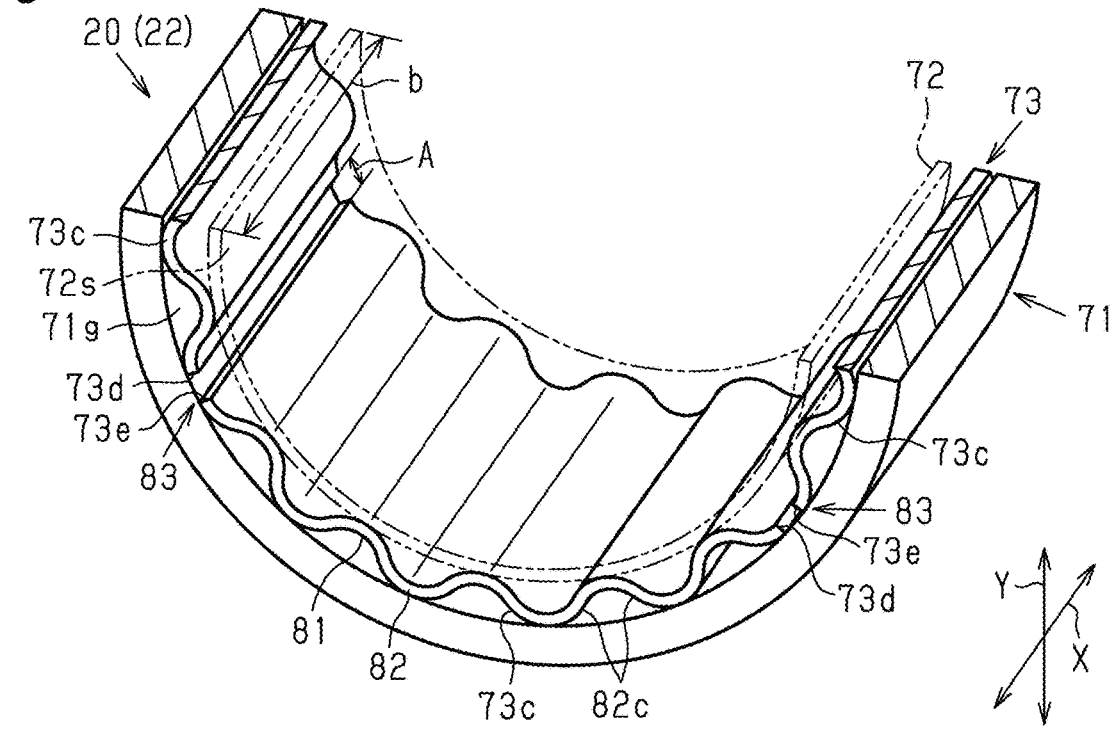
FIG. 5 is a perspective view showing the first foil bearing of the first embodiment in the first state.

Referring to FIGS. 4 and 5, the first state S1 is now described. In the first state S1, the rotation shaft 40 is spaced apart from the bearing surface 72*s*. This state of the first foil bearing 20 is referred to as the first state S1. In the first state S1, the load received by the bearing surface 72*s* from the rotation shaft 40 is less than or equal to a threshold value P.

As shown in FIG. 4, in the first state S1, the top foil 72 is elastically deformed outward in the radial direction Y as the rotation shaft 40 rotates. This forms an air film between the rotation shaft 40 and the top foil 72, generating dynamic pressure. The first foil bearing 20 rotationally supports the rotation shaft 40 in a state in which the rotation shaft 40 is not in contact with the top foil 72.

When the air film between the rotation shaft 40 and the top foil 72 elastically deforms the top foil 72 outward in the radial direction Y, the top foil 72 presses the crest portions 81 of the bump foil 73, which are in contact with the outer circumference surface 72*f* of the top foil 72. This elastically deforms the bump foil 73 outward in the radial direction Y together with the top foil 72. The bump foil 73 thus elastically supports the top foil 72. As the top foil 72 is displaced outward in the radial direction Y, the crest portions 81 and the trough portions 82 are elastically deformed. In the first state S1, a load acts evenly on the entire bearing surface 72*s* from the rotation shaft 40 via the air film. This elastically deform all the crest portions 81 and the trough portions 82 uniformly.

As shown in FIG. 5, in the first state S1, each crest portion 81 of the bump foil 73 is locally in contact with the outer circumference surface 72*f* of the top foil 72. In the first state S1, the elastic deformation of the crest portions 81 increases the areas of the sections of the crest portions 81 in contact with the top foil 72 in the circumferential direction, as compared with the no-load state SN. In the first state S1, each trough portion 82 of the bump foil 73 is locally in contact with the inner surface of the bearing housing member 71. In the first state S1, the elastic deformation of the trough portions 82 increases the areas of the sections of the trough portions 82 in contact with the bearing housing member 71 in the circumferential direction, as compared with the no-load state SN.

In the first state S1, there are gaps G1 between the crest portions 81 and the bearing housing member 71. In the first state S1, there are gaps G2 between the trough portions 82 and the top foil 72. In the first state S1, the bump foil 73 supports the top foil 72 with these gaps G1 and G2 formed.

The dimension of the clearance 83 in the circumferential direction is a clearance dimension A. In the first state S1, there is a clearance 83 between adjacent ones of the fixed edges 73*d* and the free edges 73*e*. Two adjacent segments 73*c* are spaced apart from each other in the rotation direction D of the rotation shaft 40. As the crest portions 81 and trough portions 82 are elastically deformed, the segments 73*c* are deformed such that adjacent ones of the fixed edges 73*d* and the free edges 73*e* become closer to each other. Thus, the clearance dimension A is smaller in the first state S1 than in the no-load state SN.

Second State S2

Figure 6:
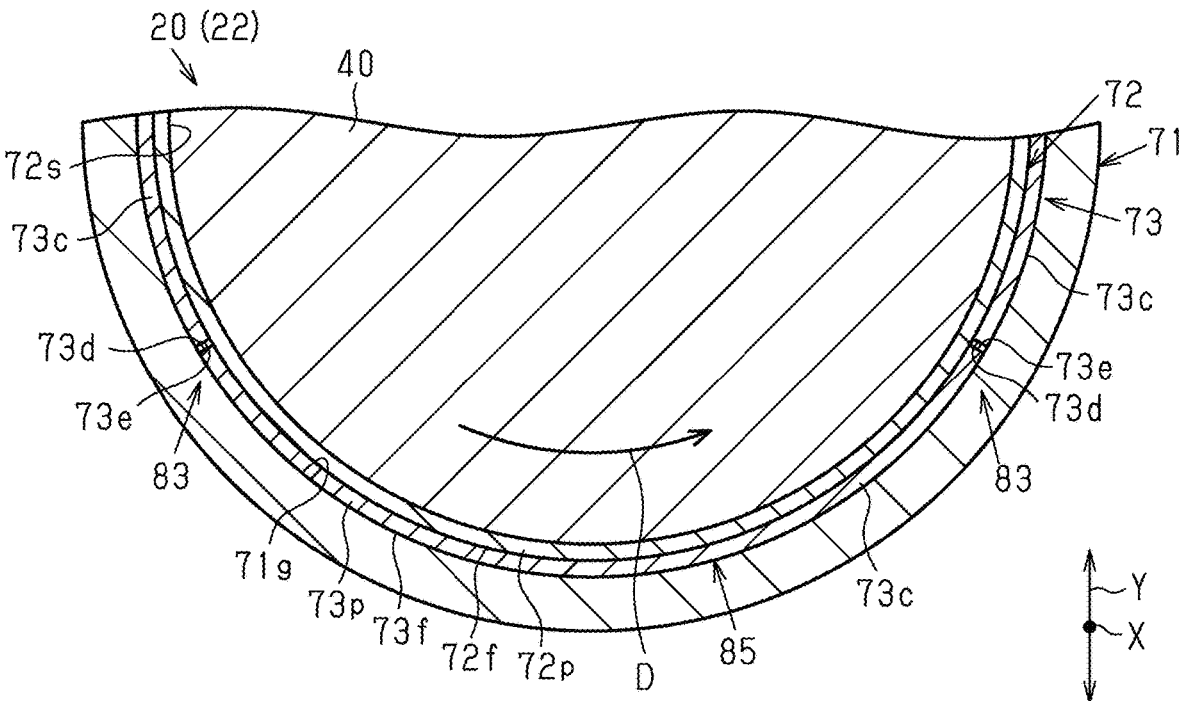
FIG. 6 is a cross-sectional view showing the first foil bearing of the first embodiment in a second state.
Figure 7:
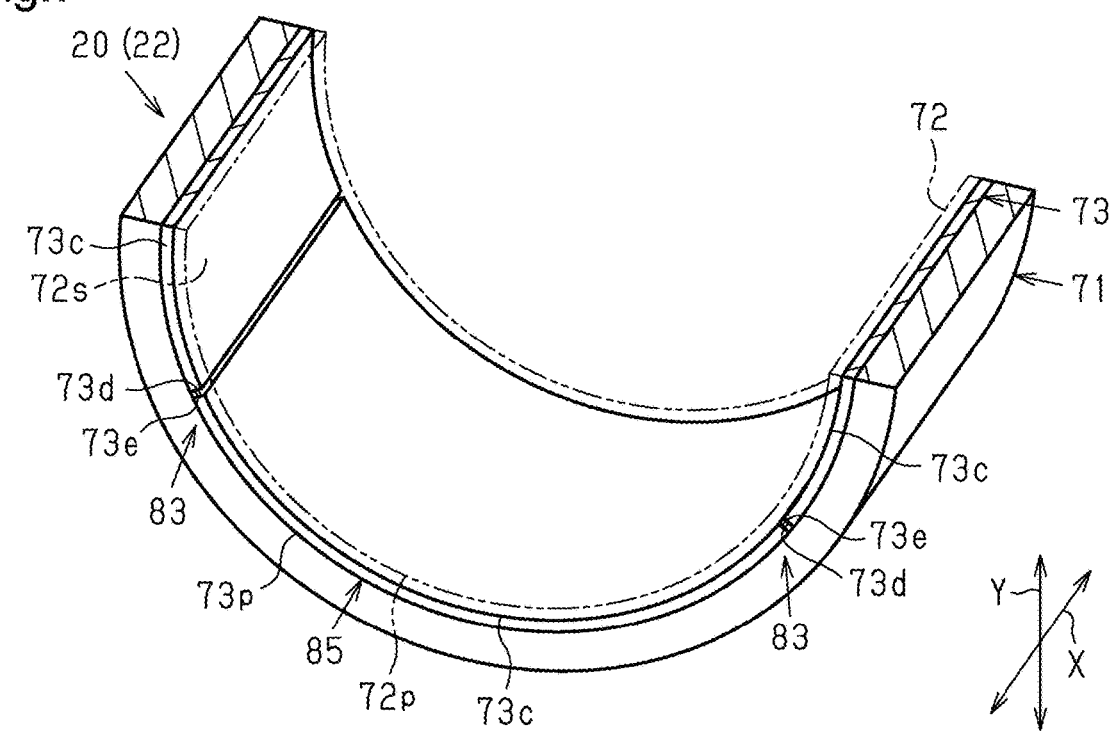
FIG. 7 is a perspective view showing the first foil bearing of the first embodiment in the second state.

Referring to FIGS. 6 and 7, a second state S2 is now described. In the second state S2, the rotation shaft 40 is closer to a section of the bearing surface 72*s* in the circumferential direction than in the first state S1. This state of the first foil bearing 20 is referred to as the second state S2. Factors responsible for the rotation shaft 40 being closer to the bearing surface 72*s* than in the first state S1 include eccentricity of the rotation shaft 40, such as displacement of the rotation shaft 40 in the radial direction Y. Also, thermal expansion of the rotation shaft 40 may increase the diameter of the rotation shaft 40. In the second state S2, the load received by the bearing surface 72*s* from the rotation shaft 40 exceeds the threshold value P.

As shown in FIG. 6, a section in the circumferential direction of the top foil 72 is a first displacement portion 72*p*. A section of the bump foil 73 located outward in the radial direction Y of the first displacement portion 72*p* is a second displacement portion 73*p*. The first displacement portion 72*p* in the second state S2 corresponds to the section of the rotation shaft 40 that is closer to the bearing surface 72*s* than in the first state S1. In the first embodiment, the whole of one segment 73*c* is exemplified as the second displacement portion 73*p*. The section of the top foil 72 that is located inward in the radial direction Y of this single segment 73*c* as the second displacement portion 73*p* is exemplified as the first displacement portion 72*p*.

In the second state S2, a load larger than that in the first state S1 acts on the first displacement portion 72*p* from the rotation shaft 40 via the air film. This displaces the first displacement portion 72*p* outward in the radial direction Y from its position in the first state S1. As such, the second state S2 may also be considered as a state of the first foil bearing 20 in which the first displacement portion 72*p* is displaced outward in the radial direction Y from its position in the first state S1.

As shown in FIG. 7, as the first displacement portion 72*p* is displaced outward in the radial direction Y, the crest portions 81 and the trough portions 82 in the second displacement portion 73*p* are elastically deformed to a greater extent than in the first state S1. As a result, in the second state S2, the areas of the second displacement portion 73*p* that are in contact with the top foil 72 and the bearing housing member 71 are larger in the circumferential direction than in the first state S1.

As the crest portions 81 and the trough portions 82 are elastically deformed, the segments 73*c* are deformed so that adjacent ones of the fixed edges 73*d* and the free edges 73*e* are closer to each other. Thus, the segment 73*c* including the second displacement portion 73*p* in the second state S2 is displaced to become larger in the rotation direction D of the rotation shaft 40 than in the first state S1. In the second state S2, there are clearances 83 between adjacent ones of the fixed edges 73*d* and the free edges 73*e*. In the second state S2, the segment 73*c* including the second displacement portion 73*p* does not overlap the segments 73*c* adjacent in the rotation direction D of the rotation shaft 40. That is, the clearance dimension A in the first state S1 is set to be greater than or equal to the amount of displacement of the segment 73*c* including the second displacement portion 73*p* in the second state S2 in the rotation direction D of the rotation shaft 40.

In the second state S2, the crest portions 81 are in contact with the inner circumference surface 71*g* of the bearing housing member 71 in addition to the outer circumference surface 72*f* of the top foil 72. In the second state S2, the trough portions 82 are in contact with the outer circumference surface 72*f* of the top foil 72 in addition to the inner circumference surface 71*g* of the bearing housing member 71. The bump foil 73 supports the top foil 72 through the contact of the crest portions 81 and the trough portions 82.

In the second state S2, the second displacement portion 73*p*, which is a part of the bump foil 73, extends along the outer circumference surface 72*f* of the top foil 72 and the inner circumference surface 71*g* of the bearing housing member 71. Thus, in the second state S2, the top foil 72 and the bump foil 73 locally function as a plain bearing 85 to support the rotation shaft 40.

Even when the top foil 72 and the bump foil 73 locally form the plain bearing 85, the first tip clearance 55 between the first impeller 34 and the first shroud surface 53*a* is greater than 0. Even when the top foil 72 and the bump foil 73 locally form the plain bearing 85, the second tip clearance 56 between the second impeller 35 and the second shroud surface 53*b* is greater than 0.

Calculation Expression Using Beam Model

Figure 8:
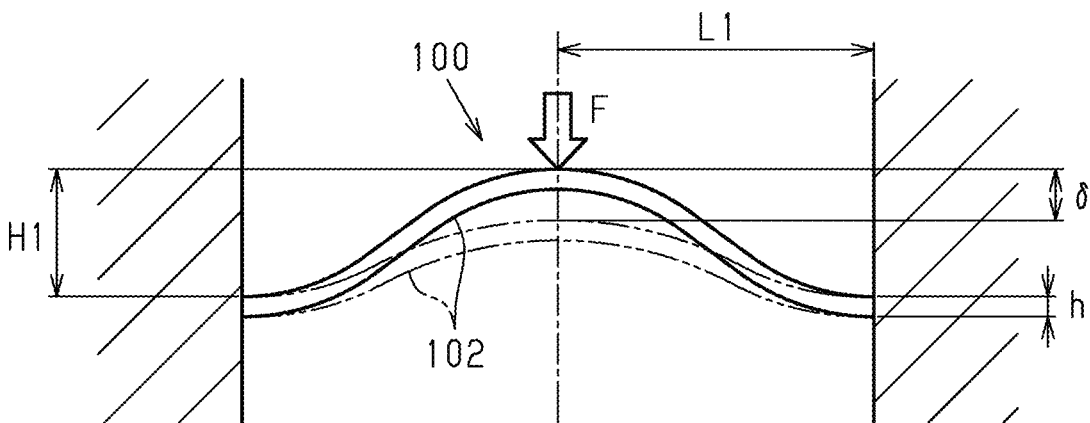
FIG. 8 is a schematic diagram showing one pitch of the bump foil.
Figure 9:
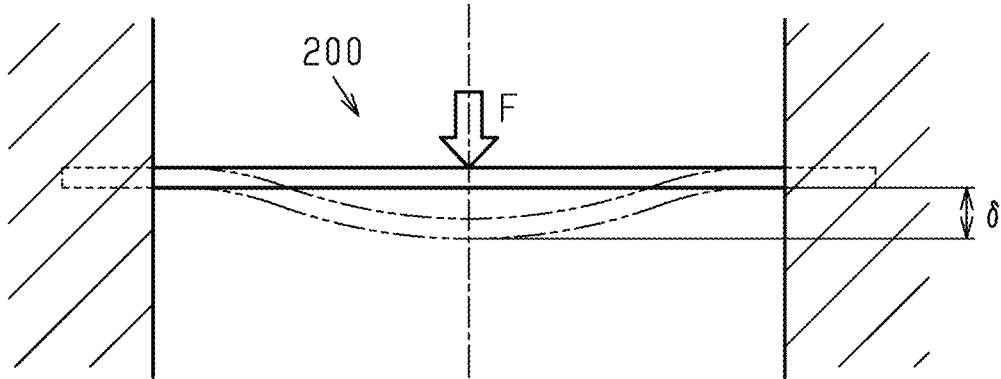
FIG. 9 is a schematic diagram showing a beam model.

As shown in FIGS. 8 and 9, a first model 100 and a second model 200 are used to study the deformation amount δ of the bump foil 73 within the elastic deformation range. The first model 100 is one pitch of the bump foil 73. The first model 100 includes a first convex portion 102, which is curved in an arc so as to bulge from opposite ends. The opposite ends of the first model 100 correspond to trough portions 82. The first convex portion 102 corresponds to a crest portion 81. The second model 200 is a model in which one pitch of the bump foil 73 is modeled as a beam fixed at both ends. The second model 200, which is a beam model, is a flat plate member extending between one end and the other end. Both ends of the second model 200 are fixed. In these models, the bump pitch is 2L1, and the bump thickness is h. In these models, the applied load is F, the bearing width is b, the stress is σ, the deformation amount is δ, and the Young's modulus is E. The bearing width b is the length of the bump foil 73 in the axial direction X. The bump pitch 2L1 corresponds to the second distance L1 multiplied by 2. The bump thickness h corresponds to the thickness h1.

In the second model 200, the following Expression 1 and Expression 2 hold.

$$\delta = \frac{F(2L1)^3}{16Ebh^3} \qquad \text{[Expression 1]}$$

$$\sigma_{max} = \frac{3F(2L1)}{4bh^2} \qquad \text{[Expression 2]}$$

From the above Expression 1 and Expression 2, the following Expression 3 can be derived.

$$\delta = \frac{(L1)^2}{3Eh}\sigma_{max} \qquad \text{[Expression 3]}$$

A typical bump foil 73 is made of alloy or stainless steel, and thus generally has a Young's modulus E of about 200 [GPa] and a yield strength σmax of about 1000 [MPa]. The following Expression 4 is derived by substituting these values into Expression 3.

$$\delta = \frac{(L1)^2}{600h} \qquad \text{[Expression 4]}$$

From the above Expression 4, a deformation amount δ of less than or equal to L1²/600h is in the elastic range, and a deformation amount δ greater than that is in the plastic range. In other words, L1²/600h is the maximum displacement amount in the elastic range. By setting the first distance H1, which is the height of the bump foil 73, to a value that satisfies L1²/600h>H1, the bump foil 73 can be used in the elastic range.

As in the above Expression 4, the values of the first distance H1, the second distance L1, and the thickness h1 of the bump foil 73 are set in advance so as to have the relationship L1²/600h1>H1. This allows the bump foil 73 to be elastically deformed while the amount of displacement of the bump foil 73 in the radial direction Y is less than or equal to the first distance H1. Since the deformed bump foil 73 is not plastically deformed, it can return to its shape in the no-load state SN or the first state S1. As such, the bump foil 73 has reversibility.

The crest portions 81 and trough portions 82 are set so as not to exceed the yield strength limit of the material after the threshold value P is exceeded, that is, after the support state of the top foil 72 of the first foil bearing 20 transitions from the first state S1 to the second state S2. When the load applied to the bearing surface 72*s* from the rotation shaft 40 exceeds the threshold value P and then returns to a value less than or equal to the threshold value P, the support state of the top foil 72 of the first foil bearing 20 transitions from the second state S2 to the first state S1. When the state transitions from the second state S2 to the first state S1 in this manner, the elastic force of the bump foil 73 separates the crest portions 81 from the inner circumference surface 71*g* of the bearing housing member 71 and separates the trough portions 82 from the outer circumference surface 72*f* of the top foil 72.

Operation of First Embodiment

Operation of the first embodiment is now described.

For example, due to vibration of the rotation shaft 40 or thermal expansion of the rotation shaft 40, the top foil 72 may be displaced outward in the radial direction Y from the first state S1 to the second state S2. In this case, the crest portions 81 of the bump foil 73 in contact with the outer circumference surface 72*f* of the top foil 72 may be excessively pressed by the top foil 72.

In the second state S2, the contact areas of the second displacement portion 73*p* with the top foil 72 and the bearing housing member 71 in the rotation direction D of the rotation shaft 40 are larger than those in the first state S1. In the second state S2, the second displacement portion 73*p* extends along the outer circumference surface 72*f* of the top foil 72 and the inner circumference surface 71*g* of the bearing housing member 71. As a result, at the first displacement portion 72*p* and the second displacement portion 73*p* in the second state S2, the top foil 72 and the bump foil 73 both expand in the rotation direction D of the rotation shaft 40 to form a plain bearing shape. Thus, the top foil 72 and the bump foil 73 locally form the plain bearing 85 in the second state S2, allowing the first foil bearing 20 to support the rotation shaft 40 by dynamic pressure.

Advantageous Effects of First Embodiment

The first embodiment has the following advantageous effects.

(1-1) When the load applied to the bearing surface 72*s* from the rotation shaft 40 exceeds the threshold value P, crest portions 81 come into contact also with the inner circumference surface 71*g* of the bearing housing member 71 and trough portions 82 come into contact also with the outer circumference surface 72*f* of the top foil 72, allowing the bump foil 73 to support the top foil 72. This limits deformation of the bump foil 73 that would degrade the bearing performance of the first and second foil bearings 20 and 22. When the load received by the bearing surface 72*s* from the rotation shaft 40 exceeds the threshold value P, the top foil 72 and the bump foil 73 locally form the plain bearing 85, allowing the first and second foil bearings 20 and 22 to support the rotation shaft 40 by dynamic pressure. This limits degradation of the bearing performance of the first and second foil bearings 20 and 22 even under conditions in which an excessive load acts on the top foil 72.

(1-2) When the load received by the bearing surface 72*s* from the rotation shaft 40 returns to a value less than or equal to the threshold value P, the elastic force of the bump foil 73 separates the crest portions 81 from the inner circumference surface 71*g* of the bearing housing member 71 and separates the trough portions 82 from the outer circumference surface 72*f* of the top foil 72. Thus, the bump foil 73 having reversibility is used, thereby further limiting degradation of the bearing performance of the first and second foil bearings 20 and 22.

(1-3) Each segment 73*c* has, in the rotation direction D of the rotation shaft 40, a fixed edge 73*d*, which is fixed to the bearing housing member 71, and a free edge 73*e*, which is not fixed to the bearing housing member 71. The segments 73*c* are arranged such that a clearance 83 is formed between adjacent ones of the fixed edges 73*d* and the free edges 73*e* regardless of expansion. Thus, even when the bump foil 73 expands in the rotation direction D of the rotation shaft 40, the adjacent segments 73*c* do not overlap each other. As a result, the displacement of the bump foil 73 in the rotation direction D of the rotation shaft 40 is not restricted, allowing the bump foil 73 to elastically support the top foil 72 in an appropriate manner.

(1-4) The crest portions 81 and trough portions 82 are formed so as not to exceed the yield strength limit of the material after exceeding the threshold value P. As such, even after the load received by the bearing surface 72*s* from the rotation shaft 40 exceeds the threshold value P, the bump foil 73 is less likely to be deformed to an extent that degrades the bearing performance of the first and second foil bearings 20 and 22.

(1-5) When no load acts on the bearing surface 72*s* from the rotation shaft 40, the second distance L1, the thickness h1, and the first distance H1 have a relationship of $L1^2/600h1 > H1$. Accordingly, the maximum displacement amount of the bump foil 73 in the radial direction Y is the amount of displacement of the bump foil 73 conforming to the inner circumference surface 71*g* of the bearing housing member 71, and is the first distance H1. When the distance is less than or equal to the first distance H1, the bump foil 73 is elastically deformed. Since the deformed bump foil 73 is not plastically deformed, it can return to the shape of the bump foil 73 in a state in which the load received by the bearing surface 72*s* from the rotation shaft 40 is less than or equal to the threshold value P. Thus, the bump foil 73 having reversibility is used, thereby further limiting degradation of the bearing performance of the first and second foil bearings 20 and 22.

(1-6) Even when the top foil 72 and the bump foil 73 locally form the plain bearing 85, the first tip clearance 55 and the second tip clearance 56 are greater than 0. As such, even when the top foil 72 is locally displaced to form the plain bearing 85, the first impeller 34 is unlikely to collide with the first shroud surface 53*a*, and the second impeller 35 is unlikely to collide with the second shroud surface 53*b*.

(1-7) The minimum value of the first clearance dimension C1, which is the dimension of the gap between the first impeller 34 and the first shroud surface 53*a* in the radial direction Y, is greater than the first distance H1. The minimum value of a second clearance dimension C2, which is the dimension of the gap between the second impeller 35 and the second shroud surface 53*b* in the radial direction Y, is greater than the first distance H1. As such, while the displacement amount of the bump foil 73 in the radial direction Y is less than or equal to the first distance H1, the first impeller 34 is unlikely to collide with the first shroud surface 53*a*, and the second impeller 35 is unlikely to collide with the second shroud surface 53*b*. This limits collision of the first impeller 34 with the first shroud surface 53*a* and collision of the second impeller 35 with the second shroud surface 53*b* even when the top foil 72 is locally displaced to form the plain bearing 85.

(1-8) The rigidity of the bump foil 73 can be increased to limit deformation of the bump foil 73, such as breakage of the bump foil 73, that degrades the bearing performance of the first and second foil bearings 20 and 22. However, in that case, even in a situation where thermal expansion of the rotation shaft 40 rotating at high speed reduces the gap between the rotation shaft 40 and the bearing surface 72*s*, the bump foil 73 resists deformation and limits widening of the gap. As a result, the rotation shaft 40 may come into direct contact with the bearing surface 72*s*. This may cause seizing of the rotation shaft 40 and the first and second foil bearings 20 and 22 due to frictional heat. Also, increased rigidity of the bump foil 73 increases the resonance frequencies of the first and second foil bearings 20 and 22. On the other hand, the excitation force (unbalanced force of the rotation shaft 40) increases in proportion to the square of the rotational speed. For this reason, the resonance points of the first foil bearing 20 and the second foil bearing 22 are reached at high rotational speeds with large excitation force, causing vibration of the rotation shaft 40. According to the first embodiment, the rigidity of the bump foil 73 does not need to be increased to limit deformation of the bump foil 73 that would deteriorate the bearing performance of the first and second foil bearings 20 and 22. Thus, the problems that would occur when the rigidity of the bump foil 73 is increased are unlikely to occur.

Second Embodiment

Referring to FIGS. 10 to 13, a foil bearing and fluid machinery according to a second embodiment are now described. The shape of the foil bearing in the second embodiment differs from that in the first embodiment. The following descriptions focus mainly on the differences from the first embodiment. The descriptions of the configurations that are the same as the first embodiment are omitted where appropriate.

Bump Foil 73

Figure 10:
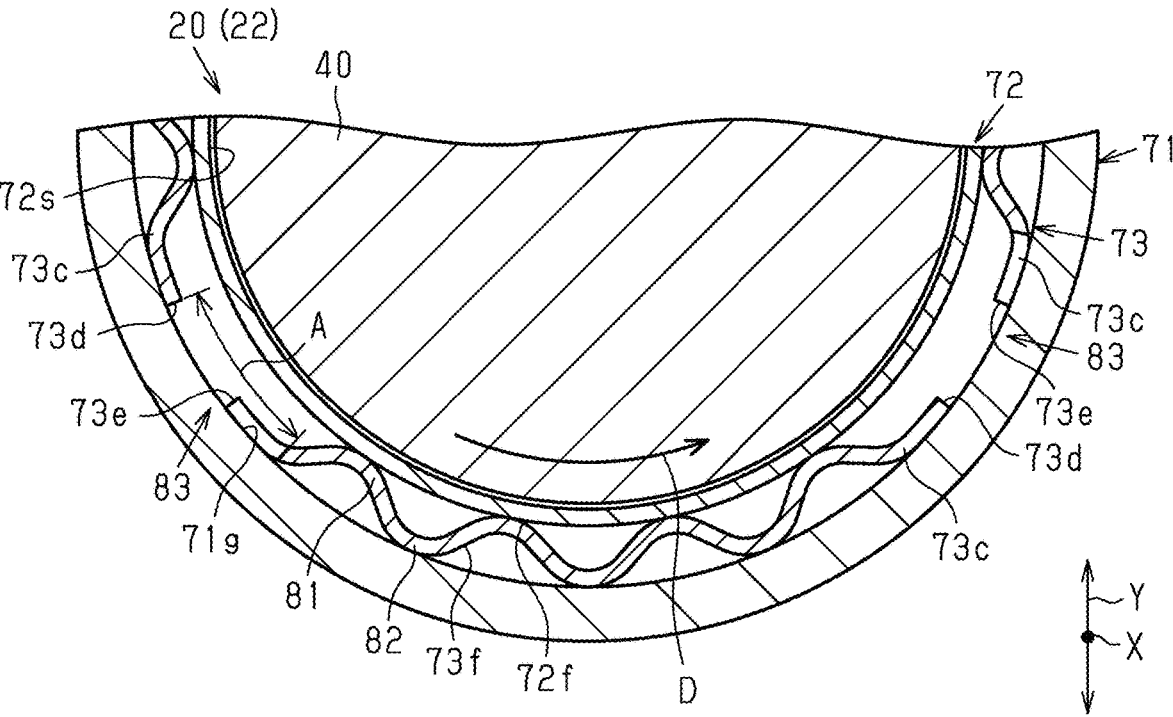
FIG. 10 is a cross-sectional view showing a first foil bearing of a second embodiment in a first state.
Figure 11:
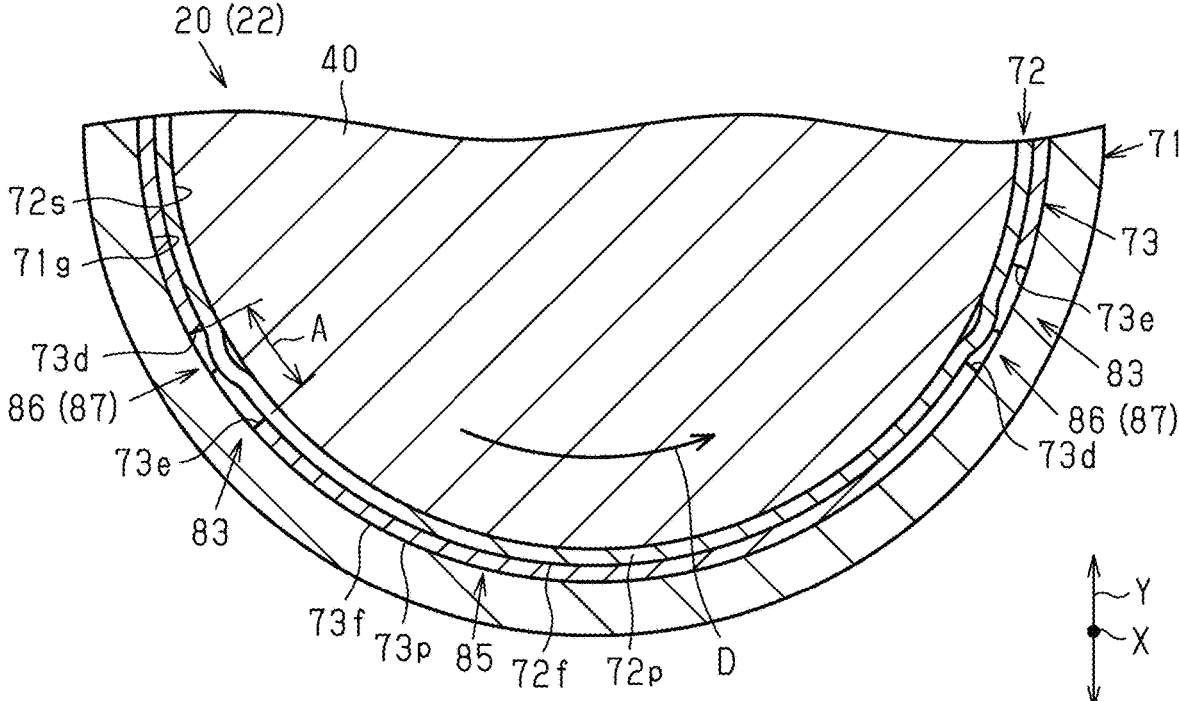
FIG. 11 is a cross-sectional view showing the first foil bearing of the second embodiment in a second state.
Figure 12:
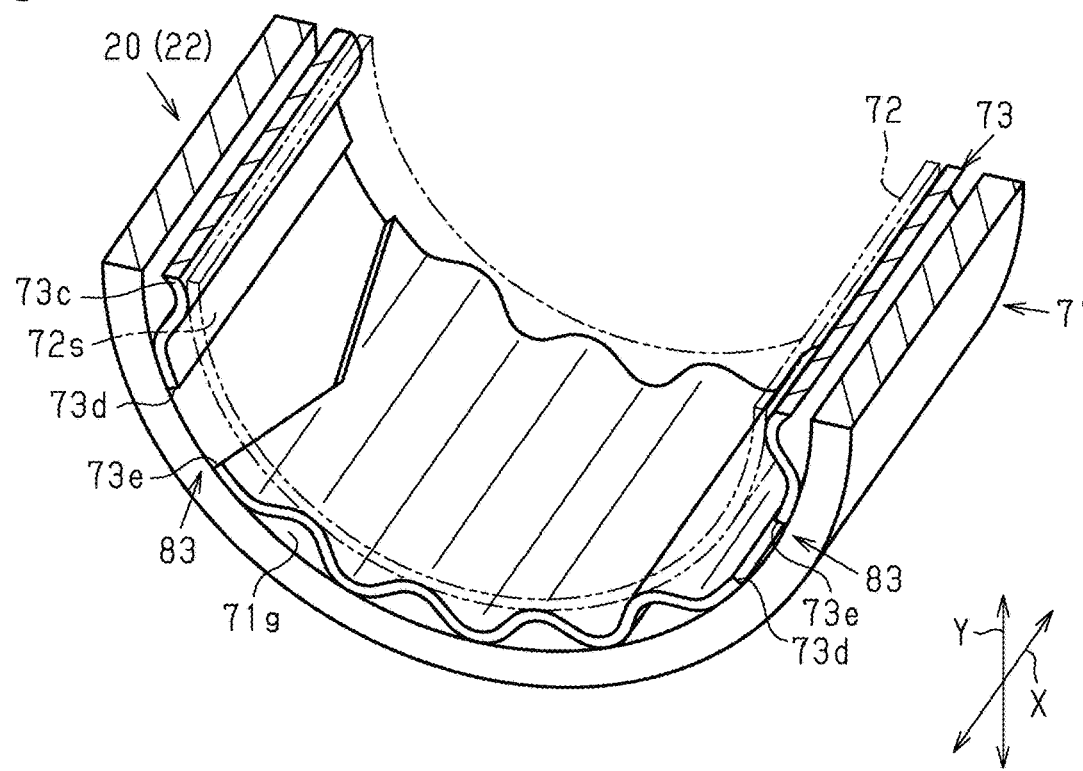
FIG. 12 is a perspective view showing the first foil bearing of the second embodiment in the first state.

As shown FIGS. 10 to 12, the segments 73*c* are arranged such that a clearance 83 is formed between adjacent ones of the fixed edges 73*d* and the free edges 73*e* regardless of expansion. The clearances 83 are formed when the supporting state of the top foils 72 of the first and second foil bearings 20 and 22 is any of the no-load state SN, the first state S1, and the second state S2.

The fixed edge 73*d* of each segment 73*c* extends in the axial direction X between one end and the other end of the segment 73*c* in the axial direction X, in a similar manner as the first embodiment. In each segment 73*c*, the free edge 73*e* is shaped such that the edge slants in the rotation direction D of the rotation shaft 40 from opposite ends of the segment 73*c* toward the central portion in the axial direction X. Due to the shapes of the fixed edge 73*d* and the free edge 73*e*, the clearance 83 forms a groove 86 of a herringbone shape.

In the second embodiment, when the state transitions from the no-load state SN to the first state S1, the bump foil 73 is deformed in a similar manner as in the first embodiment. In the second embodiment, as with the first embodiment, when no load acts on the bearing surface 72*s* from the rotation shaft 40, the second distance L1, the thickness h1, and the first distance H1 have a relationship of $L1^2/600h1 > H1$.

Second State S2

As shown in FIGS. 10 and 11, when the load applied to the bearing surface 72*s* from the rotation shaft 40 exceeds the threshold value P, crest portions 81 come into contact also with the inner circumference surface 71*g* of the bearing housing member 71 and trough portions 82 come into contact also with the outer circumference surface 72*f* of the top foil 72. In this manner, with the crest portions 81 and the trough portions 82 in contact, the bump foil 73 supports the top foil 72.

In the second embodiment, the second displacement portion 73*p* in the second state S2 extends along the outer circumference surface 72*f* of the top foil 72 and the inner circumference surface 71*g* of the bearing housing member 71, as in the first embodiment. Thus, the top foil 72 and the bump foil 73 locally form a plain bearing 85 in the second state S2, allowing the first foil bearing 20 to support the rotation shaft 40 by dynamic pressure.

Figure 13:
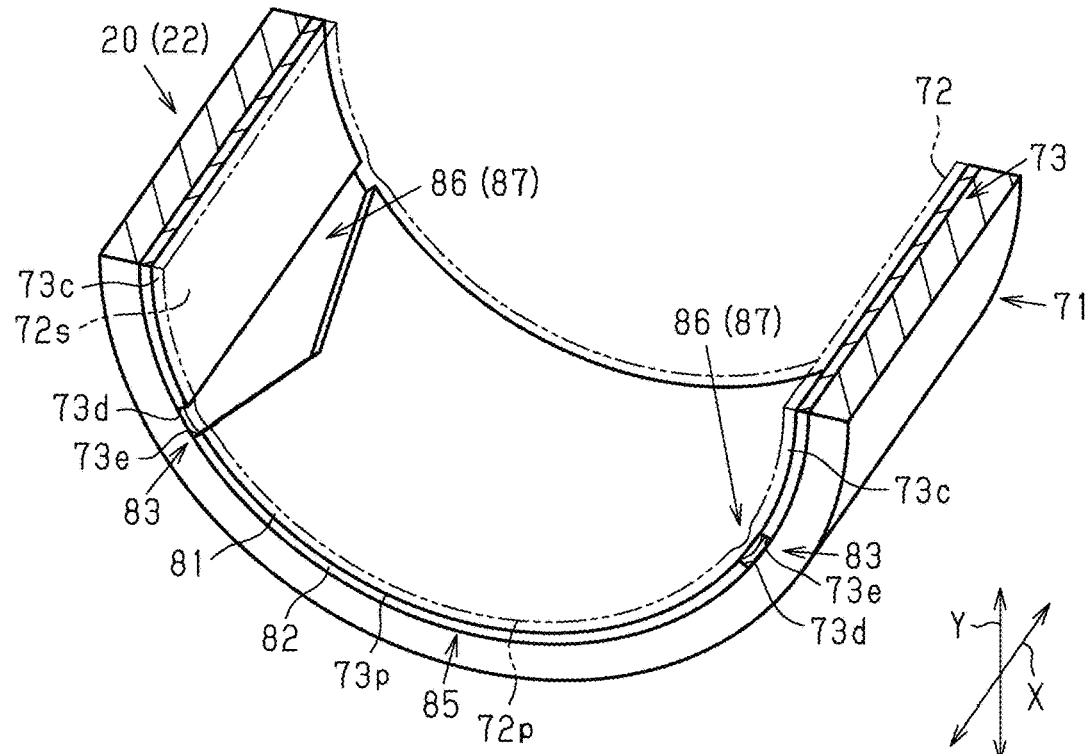
FIG. 13 is a perspective view showing the first foil bearing of the second embodiment in the second state.

As shown in FIG. 13, in the second state S2, the clearances 83 in the bump foil 73 form herringbone grooves 86. In the second state S2, the first and second foil bearings 20 and 22 locally form a herringbone bearing 87 to support the rotation shaft 40.

Operation of Second Embodiment

Operation of the second embodiment is now described.

The second displacement portion 73*p* in the second state S2 extends along the outer circumference surface 72*f* of the top foil 72 and the inner circumference surface 71*g* of the bearing housing member 71, as in the first embodiment. The top foil 72 and the bump foil 73 locally form the plain bearing 85 in the second state S2, allowing the first foil bearing 20 to support the rotation shaft 40 by dynamic pressure.

In the second state S2, a load acts on the first displacement portion 72*p* from the rotation shaft 40 via the air film. In the second state S2, the section of the top foil 72 located inward of the clearance 83 in the radial direction Y is curved so as to be pressed toward the clearance 83. As a result, the first foil bearing 20 has a herringbone bearing shape at the first displacement portion 72*p*. This also enables the first foil bearing 20 in the second state S2 to support the rotation shaft 40 by dynamic pressure.

Advantageous Effects of Second Embodiment

The second embodiment has the following advantages in addition to the advantages of the first embodiment.

(2-1) The clearances 83 are herringbone grooves 86. When the load applied to the bearing surface 72*s* from the rotation shaft 40 exceeds the threshold value P, the first and second foil bearings 20 and 22 locally form herringbone bearings 87 to support the rotation shaft 40. Thus, when the load applied to the bearing surface 72*s* from the rotation shaft 40 exceeds the threshold value P, a section of the top foil 72 that is located inward in the radial direction Y of the clearance 83 between the adjacent fixed edge 73*d* and the free edge 73*e* is curved so as to be pressed toward the clearance 83. As a result, the first and second foil bearings 20 and 22 locally form herringbone bearings 87 and thus support the rotation shaft 40. This further limits degradation of the bearing performance of the first and second foil bearings 20 and 22.

Modifications

The embodiments described above may be modified as follows. The above embodiments and the following modifications may be combined to an extent that does not cause technical contradiction.

Figure 14:
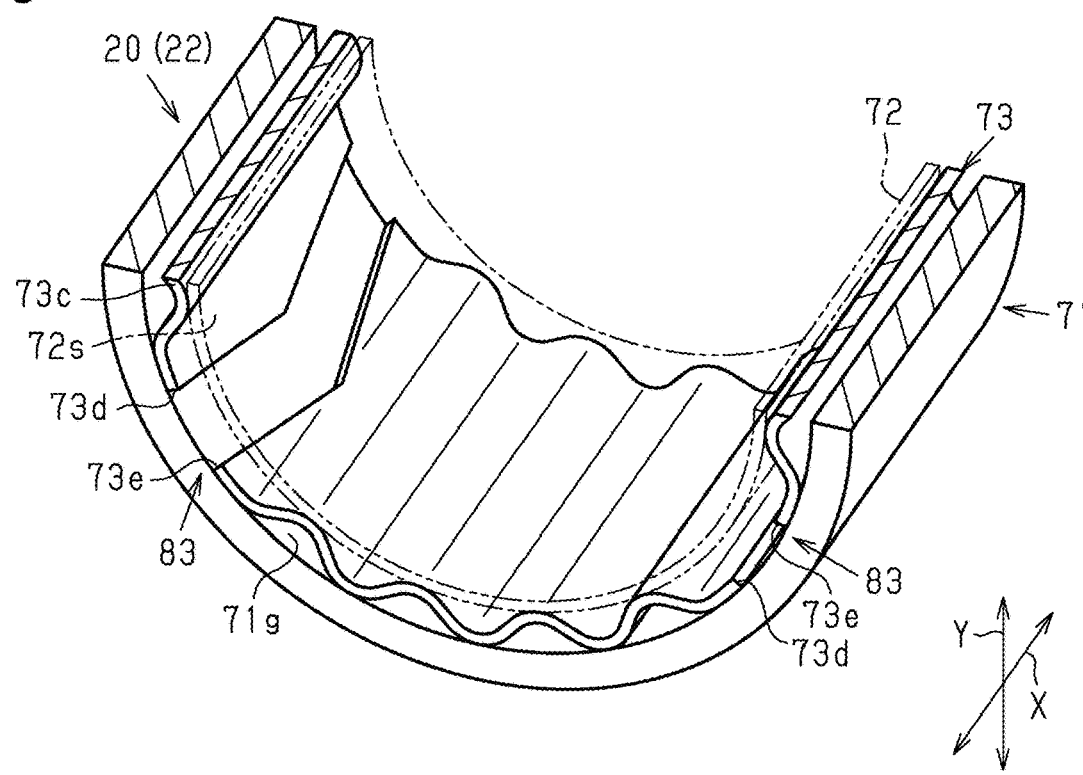
FIG. 14 is a perspective view showing a first foil bearing of a modification in a first state.
Figure 15:
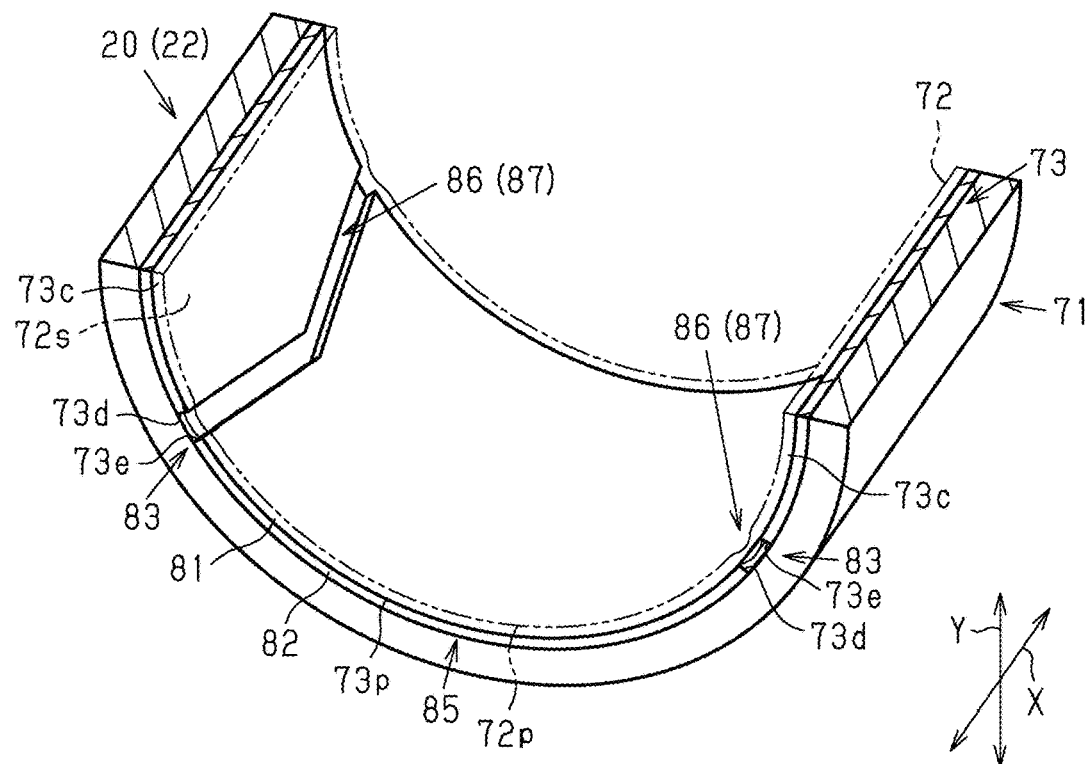
FIG. 15 is a perspective view showing the first foil bearing of the modification of FIG. 14 in a second state.

As shown in FIGS. 14 and 15, the fixed edge 73*d* may be shaped such that the fixed edge 73*d* slants in the rotation direction D of the rotation shaft 40 from opposite ends of the segment 73*c* toward the central portion in the axial direction X, in a similar manner as the free edge 73*e*. In other words, the fixed edge 73*d* may be shaped to extend along the free edge 73*e*.

The minimum value of the first clearance dimension C1 and the minimum value of the second clearance dimension C2 may be the same as the first distance H1 or may be less than the first distance H1.

When the top foil 72 and the bump foil 73 locally form a plain bearing 85, the first tip clearance 55 and the second tip clearance 56 may be 0.

The crest portions 81 and trough portions 82 may exceed the yield strength limit of the material after exceeding the threshold value P.

The second distance L1, the thickness h1, and the first distance H1 do not need to satisfy L1$^2$/600h1>H1.

When transitioning from the second state S2 to the first state S1, the bump foil 73 does not need to be deformed by its elastic force. In this case, for example, the crest portions 81 remain in contact with the inner circumference surface 71*g* of the bearing housing member 71 even when the state transitions from the second state S2 to the first state S1. For example, the trough portions 82 remain in contact with the outer circumference surface 72*f* of the top foil 72 even when the state transitions from the second state S2 to the first state S1.

When the segments 73*c* expand, the clearances 83 between adjacent fixed edges 73*d* and free edges 73*e* may disappear. In this case, in the second state S2, for example, the fixed edge 73*d* and the free edge 73*e* of two adjacent segments 73*c* may be in contact with each other.

The bump foil 73 may be a single member that is continuous over its entire circumference.

The bearing housing member 71 may be omitted from the first and second foil bearings 20 and 22. In this case, by integrating the bearing housing member 71 with the first bearing holding portion 18 and the second bearing holding portion 19, the bearing housing member 71 may be omitted from the first and second foil bearings 20 and 22, for example. The bump foil 73 and the top foil 72 may be fixed to the housing 11 by welding or interference fit.

The fluid machinery 10 does not need to include the second impeller 35, for example.

The fluid compressed by the first impeller 34 and the second impeller 35 is not limited to air. For example, the fluid may be a refrigerant or a freon atmosphere in which gas and liquid states are mixed. As such, the fluid to be compressed by the fluid machinery 10 may be any fluid. For example, the fluid machinery 10 may be used in an air conditioner. In this case, the fluid machinery 10 may compress a refrigerant. The fluid machinery 10 may be installed in any object, not only in vehicles.

REFERENCE SIGNS LIST

D) Rotation Direction; G1, G2) Gap; H1) Thickness; P) Threshold Value; Y) Radial Direction; 10) Fluid Machinery; 11) Housing; 40) Rotation Shaft; 71) Bearing Housing Member; 71*g*) Inner Circumference Surface; 71*h*) Insertion Hole; 72) Top Foil; 72*f*) Outer Circumference Surface (of Top Foil); 72*s*) Bearing Surface; 73) Bump Foil; 73*c*) Segment; 73*d*) Fixed Edge; 73*e*) Free Edge; 73*f*) Outer Circumference Surface of Bump Foil; 81) Crest Portion; 82)

Trough Portion; 83) Clearance; 85) Plain Bearing; 86) Groove; 87) Herringbone Bearing

The invention claimed is:

1. A foil bearing comprising:

a housing including an insertion hole through which a rotary member is to be inserted;

a tubular top foil including a bearing surface that faces the rotary member; and a sheet-shaped bump foil located between the top foil and the housing, the bump foil including multiple crest portions in contact with an outer circumference surface of the top foil and multiple trough portions in contact with an inner circumference surface of the housing, the crest portions and the trough portions being arranged alternately in a rotation direction of the rotary member, and the crest portions and the trough portions being configured to expand in the rotation direction so as to elastically support the top foil, wherein the bump foil is configured to, when a load received by the bearing surface from the rotary member is less than or equal to a threshold value, support the top foil with gaps formed between the crest portions and the housing and with gaps formed between the trough portions and the top foil, and the bump foil is configured to, when the load received by the bearing surface from the rotary member exceeds the threshold value, support the top foil with the crest portions in contact also with the inner circumference surface of the housing and with the trough portions in contact also with the outer circumference surface of the top foil so that the top foil and the bump foil locally form a plain bearing and support the rotary member, the bump foil is divided in the rotation direction and thus includes multiple segments, each of the segments includes, in the rotation direction, a fixed edge fixed to the housing and a free edge that is not fixed to the housing, any two of the segments that are arranged side by side in the rotation direction are disposed such that the fixed edge of one of the segments is adjacent to the free edge of the other segment and that, regardless of expansion of the two segments, a clearance is formed between the fixed edge and the free edge, which are adjacent to each other, the clearance is a herringbone groove, and the crest portions and the trough portions are configured to, when the load received by the bearing surface from the rotary member exceeds the threshold value, support the top foil with the crest portions in contact also with the inner circumference surface of the housing and with the trough portions in contact also with the outer circumference surface of the top foil so that the foil bearing locally forms a herringbone bearing and supports the rotary member.

2. The foil bearing according to claim 1, wherein the bump foil is configured such that, when the load received by the bearing surface from the rotary member exceeds the threshold value and then returns to a value less than or equal to the threshold value, an elastic force of the bump foil separates the crest portions from the inner circumference surface of the housing and separates the trough portions from the outer circumference surface of the top foil.

3. The foil bearing according to claim 1, wherein the crest portions and the trough portions are configured so as not to exceed a yield strength limit of a material after exceeding the threshold value.

4. The foil bearing according to claim 1, wherein, in a state in which no load acts on the bearing surface from the rotary member, $L1^2/600h1>H1$, where a distance between the crest portion and the trough portion that are adjacent in the rotation direction is $L1$, a thickness of the bump foil is $h1$, a distance between an outer circumference surface of the bump foil at the crest portion and the inner circumference surface of the housing in a radial direction of the rotary member is $H1$.

5. Fluid machinery comprising:

a rotary member;

an impeller configured to compress a fluid by rotating integrally with the rotary member;

an impeller housing accommodating the rotary member and the impeller; and a foil bearing, the foil bearing comprising:

a bearing housing including an insertion hole through which the rotary member is to be inserted;

a tubular top foil including a bearing surface that faces the rotary member; and a sheet-shaped bump foil located between the top foil and the bearing housing, the bump foil including multiple crest portions in contact with an outer circumference surface of the top foil and multiple trough portions in contact with an inner circumference surface of the bearing housing, the crest portions and the trough portions being arranged alternately in a rotation direction of the rotary member, and the crest portions and the trough portions being configured to expand in the rotation direction so as to elastically support the top foil, wherein the bump foil is configured to, when a load received by the bearing surface from the rotary member is less than or equal to a threshold value, support the top foil with gaps formed between the crest portions and the bearing housing and with gaps formed between the trough portions and the top foil, the bump foil is configured to, when the load received by the bearing surface from the rotary member exceeds the threshold value, support the top foil with the crest portions in contact also with the inner circumference surface of the bearing housing and with the trough portions in contact also with the outer circumference surface of the top foil so that the top foil and the bump foil locally form a plain bearing and support the rotary member, the impeller housing includes a shroud surface that covers an outer circumference of the impeller, and a tip clearance between the impeller and the shroud surface is greater than 0 even when the top foil and the bump foil locally form the plain bearing.

6. Fluid machinery comprising:

a rotary member;

an impeller configured to compress a fluid by rotating integrally with the rotary member;

an impeller housing accommodating the rotary member and the impeller; and a foil bearing, the foil bearing comprising:

a bearing housing including an insertion hole through which the rotary member is to be inserted;

a tubular top foil including a bearing surface that faces the rotary member; and a sheet-shaped bump foil located between the top foil and the bearing housing, the bump foil including multiple crest portions in contact with an outer circumference surface of the top foil and multiple trough portions in contact with an inner circumference surface of the bearing housing, the crest portions and the trough portions being arranged alternately in a rotation direction of the rotary member, and the crest portions and the trough portions being configured to expand in the rotation direction so as to elastically support the top foil, wherein the bump foil is configured to, when a load received by the bearing surface from the rotary member is less than or equal to a threshold value, support the top foil with gaps formed between the crest portions and the bearing housing and with gaps formed between the trough portions and the top foil, the bump foil is configured to, when the load received by the bearing surface from the rotary member exceeds the threshold value, support the top foil with the crest portions in contact also with the inner circumference surface of the bearing housing and with the trough portions in contact also with the outer circumference surface of the top foil so that the top foil and the bump foil locally form a plain bearing and support the rotary member, the impeller housing includes a shroud surface that covers an outer circumference of the impeller, and a distance between an outer circumference surface of the bump foil at the crest portion and the inner circumference surface of the housing in a radial direction of the rotary member is $H1$ in a state in which no load acts on the bearing surface from the rotary member, and a minimum value of a gap between the impeller and the shroud surface in the radial direction is greater than $H1$.

\* \* \* \* \*